(12) United States Patent
Drako

(10) Patent No.: US 9,744,879 B2
(45) Date of Patent: Aug. 29, 2017

(54) DISTRIBUTED MOTOR TORQUE GENERATION SYSTEM AND METHOD OF CONTROL

(71) Applicant: Dean Drako, Austin, TX (US)

(72) Inventor: Dean Drako, Austin, TX (US)

(73) Assignee: R Motor Company, Austin, TX (US)

( * ) Notice: Subject to any disclaimer, the term of this patent is extended or adjusted under 35 U.S.C. 154(b) by 0 days.

(21) Appl. No.: 15/164,621

(22) Filed: May 25, 2016

(65) Prior Publication Data

US 2016/0264019 A1    Sep. 15, 2016

Related U.S. Application Data

(63) Continuation-in-part of application No. 14/499,203, filed on Sep. 28, 2014, now abandoned.

(51) Int. Cl.
*B60L 15/20* (2006.01)
*B60L 15/02* (2006.01)
(Continued)

(52) U.S. Cl.
CPC ........ *B60L 15/2045* (2013.01); *B60K 7/0007* (2013.01); *B60K 17/043* (2013.01); *B60K 17/356* (2013.01); *B60L 3/102* (2013.01); *B60L 3/106* (2013.01); *B60L 11/1803* (2013.01); *B60L 15/025* (2013.01); *B60L 15/2036* (2013.01); *B60W 30/045* (2013.01); *H02P 5/747* (2013.01); *B60L 2220/46* (2013.01); *B60L 2240/423* (2013.01); *B60L 2240/427* (2013.01); *B60L 2240/463* (2013.01); *B60L 2240/465* (2013.01); *B60L 2260/28* (2013.01); *B60W 2520/06* (2013.01); *B60W 2520/105* (2013.01); *B60W 2540/30* (2013.01);
(Continued)

(58) Field of Classification Search
CPC ...... B60L 15/2045; B60L 3/102; B60L 3/106; B60L 11/1803; B60L 15/025; B60L 15/2036; B60L 2220/46; B60L 2240/423; B60L 2240/427; B60L 2240/463; B60L 2240/465; B60K 7/0007; B60K 17/043; B60K 17/356; B60W 30/045; B60W 2520/06; B60W 2520/105; B60W 2540/30; B60W 2550/12; B60W 2550/14; B60W 2710/083; B60W 2720/40; H02P 5/747; Y02T 10/648; Y02T 10/7005; Y02T 10/7258
USPC ............... 701/22, 2, 99; 318/400.11, 400.29, 318/254.1, 151, 700; 180/65.31, 65.8, 180/54.1
See application file for complete search history.

(56) References Cited

U.S. PATENT DOCUMENTS

| | | | | |
|---|---|---|---|---|
| 6,023,136 A * | 2/2000 | Pinewski | ............ | B60L 11/1803 318/400.02 |
| 2006/0220608 A1* | 10/2006 | Izumi | ....................... | B60K 6/34 318/801 |
| 2014/0222265 A1* | 8/2014 | Miftakhov | .......... | B60L 15/2045 701/22 |

* cited by examiner

*Primary Examiner* — Marthe Marc-Coleman
(74) *Attorney, Agent, or Firm* — Patentry; Peter G. H. Hwang

(57) ABSTRACT

An apparatus for an electrically powered terrestrial vehicle applies electrical energy to front wheels and to rear wheels. A control system receives desired acceleration inputs and provides target torque requirements to a plurality of adaptive field-oriented motor control circuits. One or more three-phase alternating current synchronous motors receive voltage magnitude and voltage frequency to generate torque, which is applied through a reduction gear. One motor only may be powered during certain modes of operation.

3 Claims, 4 Drawing Sheets

(51) Int. Cl.
*B60W 30/045* (2012.01)
*H02P 5/747* (2006.01)
*B60L 3/10* (2006.01)
*B60L 11/18* (2006.01)
*B60K 7/00* (2006.01)
*B60K 17/04* (2006.01)
*B60K 17/356* (2006.01)

(52) U.S. Cl.
CPC ..... *B60W 2550/12* (2013.01); *B60W 2550/14* (2013.01); *B60W 2710/083* (2013.01); *B60W 2720/40* (2013.01); *Y02T 10/648* (2013.01); *Y02T 10/7005* (2013.01); *Y02T 10/7258* (2013.01)

DISTRIBUTED MOTOR TORQUE GENERATION SYSTEM AND METHOD OF CONTROL

CROSS-REFERENCES TO RELATED APPLICATIONS

This application benefits from Ser. No. 61/950,229 filed 10 Mar. 2014 "Adaptive Torque Budgeting and Electric Motor Control System" which is incorporated by reference in its entirety and receives the priority date thereof.

This application is a continuation in part of Ser. No. 14/499,203 filed Sep. 28, 2014.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Technical Field

The field of the invention is within motor vehicles, and more specifically the control over distribution of torque generation by a plurality of electric motors located throughout the vehicle structure.

2. Description of the Related Art

It is known that torque vectoring is provided to all wheel drive vehicles. Torque vectoring is a known technology employed in automobile differentials. A differential transfers engine torque to the wheels. Torque vectoring technology provides the differential with the ability to vary the power to each wheel. This method of power transfer has recently become popular in all-wheel drive vehicles. Some newer front-wheel drive vehicles also have a basic torque vectoring differential. As technology in the automotive industry improves, more vehicles are equipped with torque vectoring differentials.

Differentials are known to refer to a particular type of simple planetary gear train that has the property that the angular velocity of its carrier is the average of the angular velocities of its sun and annular gears. This is accomplished by packaging the gear train so it has a fixed carrier train ratio $R=-1$, which means the gears corresponding to the sun and annular gears are the same size. This can be done by engaging the planet gears of two identical and coaxial epicyclic gear trains to form a spur gear differential. Another approach is to use bevel gears for the sun and annular gears and a bevel gear as the planet, which is known as a bevel gear differential.

The fundamental concept of torque vectoring depends on the principles of a standard differential. A differential shares available torque between wheels. This torque sharing ability improves handling and traction. Torque vectoring differentials were originally used in racing. The technology has slowly developed and is now being implemented in a small variety of production vehicles. The most common use of torque vectoring in automobiles today is in all-wheel drive vehicles.

The main goal of torque vectoring is to vary a share of torque between or among wheels coupled to a motor or engine. Differentials generally consist of only mechanical components. A torque vectoring differential often includes an electronic monitoring system in addition to standard mechanical components. This electronic aspect is only to direct the mechanical differential when and how to share the torque.

Torque vectoring differentials on front or rear wheel drive vehicles are less complex than all-wheel drive differentials. The two wheel differential only shares torque between two wheels.

A front-wheel drive differential must take into account several factors. It must monitor rotational and steering angle of the wheels. As these factors vary during driving, different forces are exerted on the wheels. The differential monitor these forces, and adjusts torque accordingly. Many front-wheel drive differentials can increase or decrease torque transmitted to a certain wheel by changing the ratio between the two wheels. This ability improves a vehicle's capability to maintain traction in poor weather conditions. When one wheel begins to slip, the differential can reduce the torque to that wheel, effectively braking the wheel. The differential also increases torque to the opposite wheel, helping balance the power output and keep the vehicle stable. A rear-wheel drive torque vectoring differential works the same way as a front-wheel drive differential, but doesn't monitor the steering angle.

Most mechanical torque vectoring differentials are on all-wheel drive vehicles. A first torque vectoring differential varies torque between the front and rear wheels. This means that under normal driving conditions, the front wheels receive a set percentage of the engine torque, and the rear wheels receive the rest. If needed, the differential can transfer more torque between the front and rear wheels to improve vehicle performance.

For example, a vehicle might have a standard torque distribution of 90% to the front wheels and 10% to the rear. Under harsh conditions, the differential changes the distribution to 50/50. This new distribution spreads the torque more evenly between all four wheels. Having more even torque distribution increases the vehicle's traction.

There are more advanced torque vectoring differentials as well. These differentials build on basic torque transfer between front and rear wheels. They add the capability to share torque between a pair of front wheels or a pair of rear wheels.

The differential monitors each wheel independently, and distributes available torque to match current conditions. One known mechanism first transfers power between front and rear pairs and subsequently shares the amount of torque transmitted to each rear wheel by a second differential in series. The front wheels, however, do not receive different amounts of torque. Another known torque vectoring system adds a third mechanical differential to share torque provided to the front pair of wheels.

Another known system supports 4 electric motors coupled by gearboxes and axles to individual wheels. Negative torque is produced electrically rather than applying brakes as mechanical systems do.

As is known, Mercedes Benz has provided a purpose built electric vehicle with four synchronous independent electric motors. The engines make a total of 740 (750 PS) and 1,000 Nm (737.5 lb-ft), which is split equally among the four wheels in normal driving conditions. Because all four motors are electrically-powered independently of one another translates into potentially high speed wheel control.

The conventional Mercedes approach are still mechanically linking each motor to its wheel by a reduction gearbox and axle. A much more economical Tesla utilizes a single 3 phase AC induction motor and has a conventional mechanical power train. A conventional mechanical power train provides three differentials and reduction gearboxes. A conventional power train must have the same reduction ratio from engine to the front axis as well as to the rear axis to enable all wheel drive.

It is known that torque vectoring is particularly suited to electric vehicles. Lotus has been evaluating and developing new systems and approaches. When a driver turns the steering wheel, they expect the vehicle to change direction (yaw). The vehicle does not, however, respond immediately because tires take time to build up lateral forces, and the actual vehicle response may not be exactly what is required, or expected.

Particularly at high vehicle speed, after an initial delay period (a fraction of a second) the vehicle yaw rate can overshoot and oscillate before settling on a steady value. At very high speeds, or if the vehicle's suspension is poorly tuned or the operator poorly skilled, the oscillations can increase and the vehicle can go out of control. Even at lower speeds, the oscillations can make the vehicle feel less stable and the driver may need to make multiple steering adjustments to successfully follow the intended path.

Conventional vehicle suspension is tuned through bump steer, static settings, etc, to minimize the oscillations and to give a stable response at all vehicle speeds and loading conditions, but any increase in stability is at the expense of vehicle agility and the vehicle response can become disappointing.

It is known that when a vehicle has independent control over the drive and braking torques to each wheel (for instance, electric hub motors), there is an opportunity to improve the vehicle yaw response.

One approach has been by increasing the drive torque to a pair of tandem wheels (e.g. port), and creating an effective braking torque at the opposite pair of tandem wheels (e.g. starboard). These drive torques are in addition (or subtracted from) to the normal drive torques required to control vehicle speed. In other words, turning or yaw occurs when one side of a car is traveling faster than the other side.

Maximum Yaw Turning Moment (Torque)

Independent of the steered angle of the wheels, a yaw moment is generated when the resultant vector of the tire forces is perpendicular to a line through the center of gravity. The resultant force is the vector sum of lateral force and driving/braking force. The maximum yaw moment (if required) is obtained when the resultant of the tire forces is perpendicular to a line from the center of the tire to the vehicle center of gravity.

There are two main advantages in using these resultant forces to control vehicle yaw (as opposed to purely tire lateral forces): a. The resultant force can act at a greater lever arm, increasing the maximum moment available. b. Yaw rate can be controlled without requiring any steering.

If the forces are correctly controlled, the vehicle can be made to respond more quickly to a steering input and instability can be reduced.

To do this, the control of the wheel torques needs to consider: a. Increasing torque on the one side must be balanced by a reduction on the other side to avoid unnecessary acceleration. b. Vertical load on each wheel—particularly as the vehicle corners, c. the vertical load on the inner wheels reduce and drive/braking torque may cause wheel spin or wheel lock-up. c. The addition of drive or braking torques at the rear may result in loss of rear grip—leading to loss of control. d. Any response must be safe and predictable.

Therefore, simply distributing the torque based on steering wheel angle would achieve more yaw response (for the same steering input), but it may not create any improvement in stability. It could even make the vehicle behavior less predictable.

One known approach is yaw rate feedback. For any steer angle and forward velocity, an ideal yaw rate can be calculated by assuming no tire slip, and using the wheel geometry to approximate the turn radius. The measured yaw rate is then used as feedback, giving a yaw error. A differential term (yaw acceleration) is included for damping. The output is used to control the distribution of drive torque; i.e. for a left turn, an additional torque is applied to the right, with an equal braking torque applied to the left. These torques are in addition to the 'normal' drive torque that maintains the vehicle forward velocity.

A limitation to conventional feedback control is that the system relies on measured yaw rate as an input signal. This measured response data will also include 'noise' (high frequency waves created by road inputs and general vibration). In order to use the signal, the signal must be filtered. This unfortunately creates a time delay in the signal, and the feedback becomes too late creating overshoot and oscillations in the response.

Electric Motor or Traction Drive Controls

Transmitting positive or negative values in Newton meters.

It is known that Direct Torque Control provides used in variable frequency drives to control the torque (and thus finally the speed) of three-phase AC electric motors. This involves calculating an estimate of the motor's magnetic flux and torque based on the measured voltage and current of the motor.

See patents by Depenbrock, takahashi and Noguchi direct self control and direct torque control.

U.S. Pat. No. 4,678,248 discloses a method for controlling a rotating-field machine supplied from an inverter, the output voltage system of the inverter being variable with respect to amplitude, phase and frequency includes supplying amplitudes of stator flux components formed from measured stator current components and stator voltage components as actual value of a flux control loop, and changing the phase and frequency of the inverter output voltage system with a flux control as a function of a predetermined stator flux reference value by directly setting-in the switching state of the inverter and an apparatus for carrying out the method.

It is known that Vector motor control or field-oriented control provides control over three-phase AC electric motors by adjusting the output current of a VFD inverter in Voltage magnitude and Frequency. FOC is a control technique that is used in AC synchronous and induction motor applications that was originally developed for high-performance motor applications which can operate smoothly over the full speed range, can generate full torque at zero speed, and is capable of fast acceleration and deceleration but that is becoming increasingly attractive for lower performance applications as well due to FOC's motor size, cost and power consumption reduction superiority. Not only is FOC very common in induction motor control applications due to its traditional superiority in high-performance applications, but the expectation is that it will eventually nearly universally displace single-variable scalar volts-per-Hertz (V/f) control.

What is needed is an improved apparatus and method to enable dynamic wheel control for energy and torque budgeting for each wheel.

BRIEF SUMMARY OF THE INVENTION

An apparatus for an electrically powered terrestrial vehicle applies electrical energy to front wheels and to rear wheels. A control system receives desired acceleration inputs and provides target torque requirements to a plurality of adaptive field-oriented motor control circuits. One or more three-phase alternating current synchronous motors receive voltage magnitude and voltage frequency to generate torque which is applied through a reduction gear. The reduction gear may be coupled to one wheel or a pair of wheels. Forward acceleration is favored over deceleration by a chosen ratio between reduction gearing of the front axle versus reduction gearing of the rear axle. An electrically powered vehicle has diverse reduction gear ratios for front axle wheels and rear axle wheels. Torque is budgeted to improve energy efficiency when accelerating in favor of the axle with greater reduction ratio. Torque is budgeted to improve energy efficiency when cruising in favor of the axle with lesser reduction ratio.

A system for deep autonomous vehicle control allocates positive and negative torque to each wheel. A sensor system, navigation system, and control system generally control speed and direction of a vehicle and the an adaptive torque control system replaces conventional throttle and braking systems improves performance and reduces reliance on the steering system for skidding and slipping conditions due to dynamic traction and loading.

BRIEF DESCRIPTION OF THE SEVERAL VIEWS OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Figure 2:
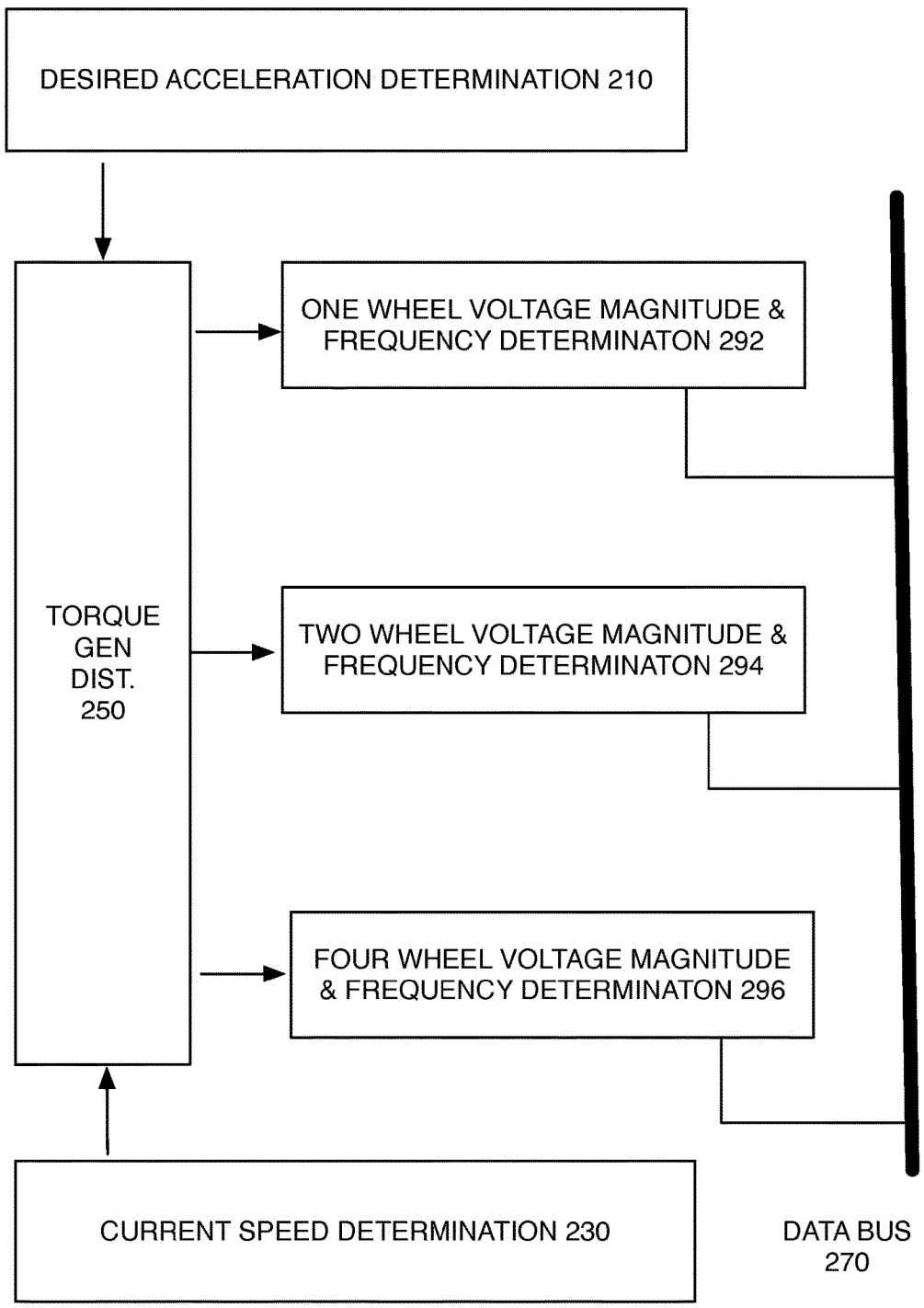
FIG. 2 is a block diagram of an apparatus.

Referring now to FIG. 2, an embodiment of an apparatus for controlling voltage magnitude and voltage frequencies at one or more AC motors. A one wheel determination circuit 292 is coupled to a data bus 270. A two wheel determination circuit 294 is coupled to the data bus 270. A four wheel determination circuit 296 is coupled to the data bus 270. Depending on the determination of the torque generation distribution circuit 250, the addressable Adaptive Field-Oriented Control circuits associated with each AC motor will receive a digital indicia of voltage magnitude and voltage frequency to be provided to their respective attached motors. The determination of the torque generation distribution is based on receiving a desired acceleration determination 210 from the operator, and current speed determination 230 from sensors. The current speeds may include the wheel spin, the while slip, and other environmental conditions.

Figure 3:
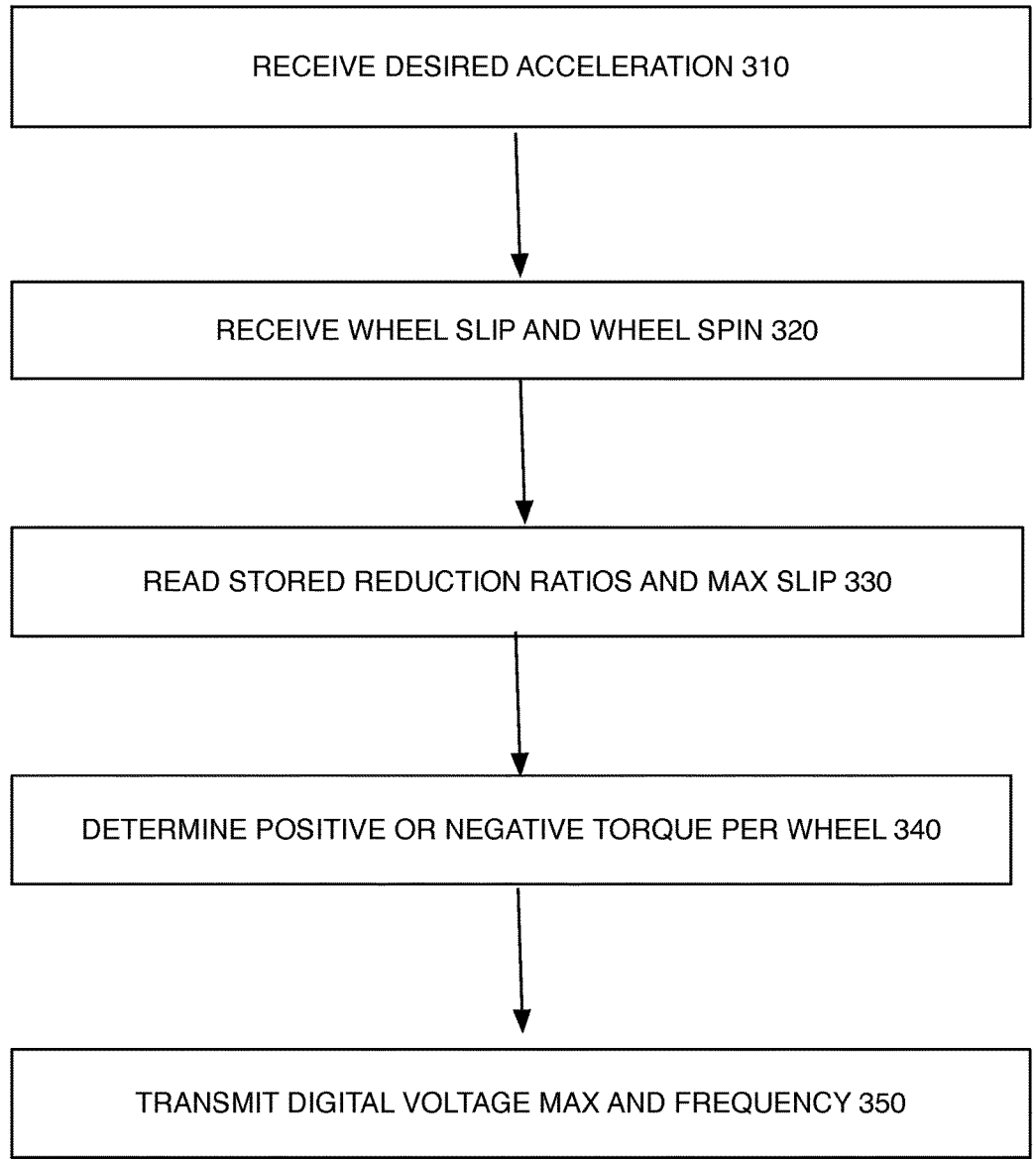
FIG. 3 is a flowchart of steps in a method performed by a processor.

Referring now to FIG. 3, one embodiment of the present invention is a method performed by a computer processor when executing instructions stored in non-transitory computer readable media, the method for operating the vehicle control unit is described. At slowest speeds, only one wheel may need to be powered. When accelerating from low speed, the wheels with the maximum reduction gear may be optimally powered. When a threshold of speed has been attained, the wheels with lower reduction gear ratios may be optimally powered. Under certain conditions of aggressive handling or poor conditions inferred from slip measurements above a threshold, all four wheels may receive separate voltage maximum and voltage frequency instructions. The method comprises the steps receiving desired acceleration indicia from the operator 310; receiving measurements of wheel slip and wheel spin from sensors 320; reading stored data values for reduction ratios of the front and rear wheels and the maximum allow slip for retaining traction for the wheels 330; determining a positive or negative desired torque for each wheel 340; and transmitting a digital voltage maximum and voltage frequency 350 to the respective control circuits.

Figure 4:
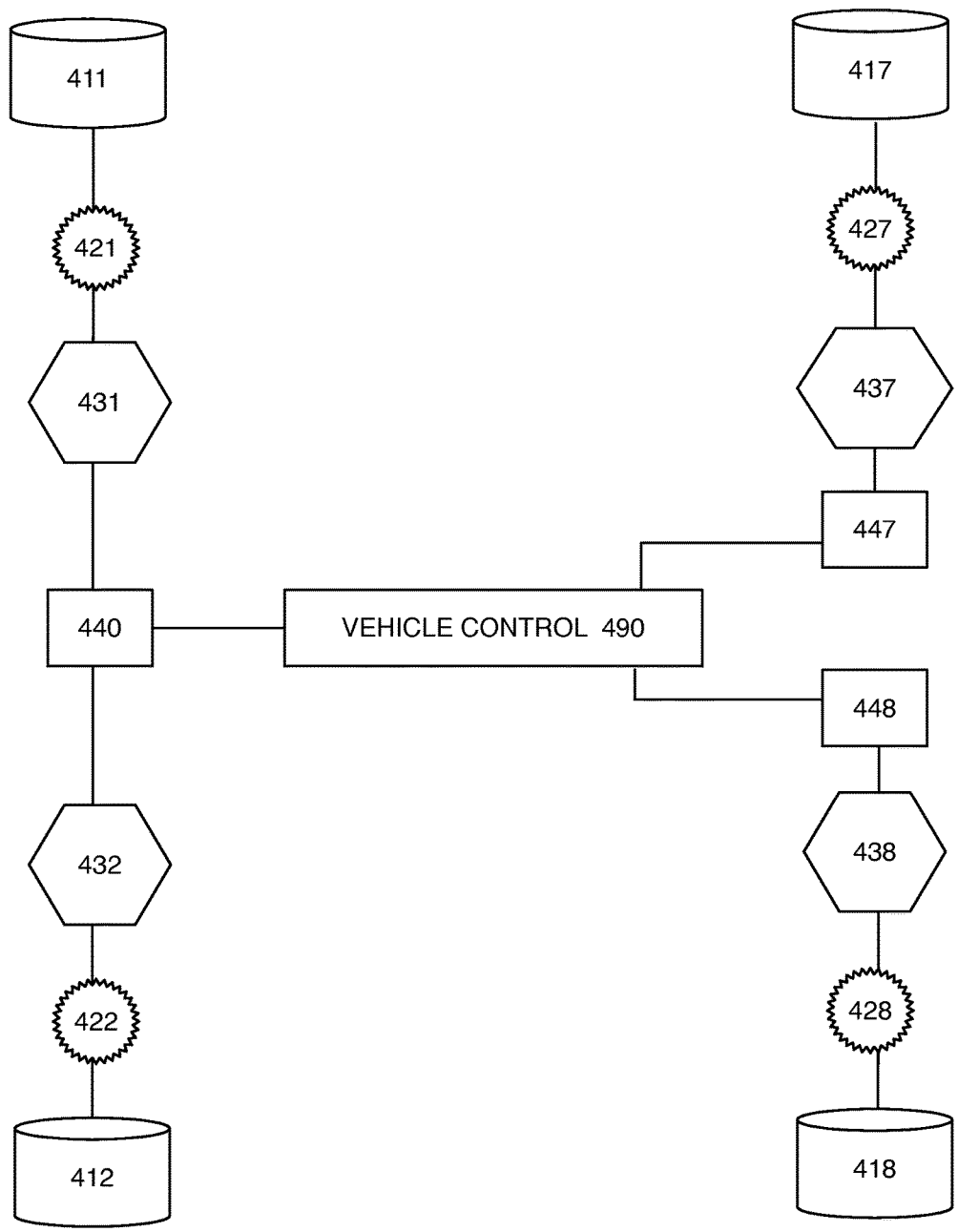
FIG. 4 is a schematic of a system embodiment.

Referring now to FIG. 4, a schematic is shown for an exemplary system embodiment. A plurality of wheels are either front wheels 411 412 or rear wheels 417 418. Each wheel is coupled to a reduction gear which have a first reduction ratio 421 422 or a second reduction ratio 427 428. Each reduction gear is powered by an AC motor 431 431 437 438. The motors are provided with voltages at magnitudes and frequencies controlled by Adaptive Field-Oriented Control circuits 440 447 448. The illustration shows that in one embodiment two wheels on one axle may receive the same torque or each wheel may receive a unique torque. The voltage magnitude and voltage frequencies for each wheel are determined and distributed from a vehicle control unit 490.

One aspect of the invention is a 4 wheel power train for a terrestrial vehicle comprising: a plurality of electric motors; each electric motor coupled directly to a wheel, each electric motor coupled to an Adaptive Torque Control or an Adaptive Field-Oriented motor control circuit which receives a positive or negative torque command from a vehicle control unit and provides the electric motor with voltage magnitude and voltage frequency. Advantageously, a vehicle control unit budgets to torque to two forward wheels, two rear wheels, or among all four wheels according to traction and desired acceleration.

In an embodiment the at least two electric motors are coupled to the four wheels by at least two reduction gears, a first of two reduction gears having a first reduction ratio of first motor speed to first wheel speed; a second of two reduction gears having a second reduction ratio of second motor speed to second wheel speed; and at least one variable frequency drive control circuit coupled to the plurality of electric motors.

In an embodiment, each of the front axle positioned wheels are coupled to one of a pair of reduction gears coupled to one of a pair of 3 phase AC electric motors which when the terrestrial vehicle has been accelerated to a cruising speed receives current having voltage magnitude and voltage frequency from the variable frequency drive control circuit to overcome air drag and surface resistance.

In an embodiment the first reduction gears have a lower reduction ratio relative to the second reduction gears and are coupled to the wheels positioned on the front axle of the terrestrial vehicle.

In an embodiment, each of the rear axle positioned wheels are coupled to one of a pair of reduction gears coupled to one of a pair of 3 phase AC electric motors which when the terrestrial vehicle is being accelerated toward a cruising speed receives voltage magnitude and voltage frequency from the variable frequency drive control circuit to overcome inertia, air drag and surface resistance.

In an embodiment the second reduction gears have a higher reduction ratio relative to the first reduction gears and are coupled to the wheels positioned on the rear axle of the terrestrial vehicle.

A method for optimizing electrical power consumption in a 4 wheel power train for a terrestrial vehicle by receiving acceleration, wheel spin, and wheel speed data from sensors and dynamically budgeting current between motors coupled the rear wheels and motors coupled to the front wheels according to the reduction ratio of the reduction gears when the terrestrial vehicle is being accelerated to a threshold.

A circuit budgets stored electrical power to front wheels and rear wheels of a vehicle according to reduction gear ratios and according to vehicle speed and acceleration.

Non-limiting illustrations of the subject matter include:

A system which includes: a plurality of wheels, each wheel being one of a front wheel and a rear wheel; a plurality of reduction gears, each reduction gear being one of a front reduction gear and a rear reduction gear; a plurality of alternating current electric motors (AC motors), each motor mechanically coupled to at least one wheel by at least one reduction gear; a plurality of adaptive field-oriented motor control circuits (AF-OC), each AF-OC electrically coupled to one or more AC motors to provide voltage magnitude and voltage frequency and communicatively coupled to a vehicle control unit (VCU) to receive digitally encoded signals which specify voltage magnitude and voltage frequency; and the vehicle control unit to budget torque among all wheels, front wheels, or rear wheels according to indicia for desired acceleration received from an operator.

In an embodiment, a pair of wheels are coupled to one reduction gear coupled to one AC motor.

In an embodiment, each front wheel is coupled to one front reduction gear coupled to one AC motor, and each rear wheel is coupled to one rear reduction gear coupled to one AC motor.

In an embodiment, each AC motor is a 3-phase electric motor.

In an embodiment, a front reduction gear has a first reduction ratio and a rear reduction year has a second reduction ratio.

In an embodiment, the first reduction ratio is greater than the second reduction ratio.

In an embodiment, the first reduction ratio is less than the second reduction ratio.

In an embodiment, the apparatus further has sensors to measure wheel rotational speed (spin).

In an embodiment, the apparatus also has sensors to measure wheel slip relative to a surface. That is, the distance the wheel travels is slightly more than or slightly less than its circumference.

In an embodiment, the apparatus further has one or more generators or stores of direct current electricity coupled to each AF-OC.

Another aspect of the invention is a computer-implemented method for optimizing energy efficiency and improving vehicle performance by executing instructions in a processor to: receive indicia for desired acceleration from an operator; receive measurements of wheel slip and wheel spin; read stored values for each reduction ratio and maximum slip, determine positive or negative torque for each wheel; and, transmit digitally encoded voltage maximum and voltage frequency to each AF-OC.

In an embodiment, more energy is provided to rear wheels when accelerating forward.

In an embodiment, more energy is provided to front wheels when not accelerating forward.

In an embodiment, the voltage maximum and voltage frequency are limited to enable no more than A % slippage when accelerating and—D % slippage when decelerating.

In an embodiment, all positive torque is provided to rear wheels when forward acceleration is desired.

In an embodiment, all negative torque is provided to front wheels when only deceleration is desired.

In an embodiment, all positive torque is provided to front wheels when only air and road resistance needs to be overcome.

Another aspect of the invention is an apparatus for controlling an adaptive field-oriented electric motor which includes: a current speed determination circuit; a desired acceleration determination circuit; a torque generation distribution circuit; and a voltage magnitude and voltage frequency determination circuit; whereby only front wheel adaptive field-oriented motor control circuits receive voltage magnitude and voltage frequency torque generation signals when a threshold speed has been attained and no further acceleration is desired, and whereby only rear wheel adaptive field oriented motor control circuits receive voltage magnitude and voltage frequency torque generation signals when acceleration is desired and a threshold speed has not been exceeded.

In an embodiment, the invention controls only one wheel at any forward or reverse speed below a threshold.

In an embodiment, the invention controls all four wheels on the condition of inclement weather, poor road quality, or aggressive cornering.

Applicant also discloses another aspect of the invention as an adaptive torque control or field-oriented control (AF-OC) circuit to control three-phase AC motor output by providing current or voltage magnitude and voltage frequency to single motor coupled to a wheel, either directly or in an embodiment through a reduction gear: the adaptive torque control or AF-OC circuit comprising: DC power input circuits; AC power output circuits; at least one microprocessor coupled to computer-readable non-transitory media; and data signal interface circuits, wherein the AF-OC circuit receives target torque commands, slip data, skid data, stability data, accelerometer data, and transmits via a network interface attainable torque; whereby adjustments to achieve target torque are provided by changes in current, voltage magnitude, and frequency rather than throttle control for positive torque and brake application for negative torque and whereby amended torque requests controlling current, voltage magnitude, and voltage frequency outputs are controlled when slip data, skid data, or stability data are received which cause the circuit to determine that a target torque cannot be attained or sustained.

In an embodiment, the propulsion apparatuses each receive a desired delta torque and control their own frequency, amplitude, phase, voltage, current, etc as needed.

In an embodiment a motor controller receives the delta torque values and supplies the propulsion apparatuses with current or voltage at the necessary phase, frequency, amplitude, or complex number.

In an embodiment, an adaptive torque control or AF-OC circuit is communicatively coupled to a plurality of other adaptive torque control or AF-OC circuits and to a torque budgeter circuit, whereby target torque commands are generated for each AF-OC circuit according to operator controls in combination with attainable torque from each AF-OC, stability data, and accelerometer data.

In an embodiment, each adaptive torque control or AF-OC circuit adjusts its torque by control over current, voltage magnitude, and frequency magnitude output when any other AFOC circuit determines a target torque cannot be attained or sustained, or transmits substantially large slip data, skid data, or stability data.

In an embodiment, a rear wheel AF-OC circuit adjusts its voltage magnitude and frequency magnitude output when a front wheel AFOC circuit determines a target torque cannot be attained or sustained, or transmits substantially large slip data, skid data, or stability data.

In an embodiment a torque budgeter circuit adjusts the target torque for rear wheel AF-OC circuits when at least one front wheel AFOC circuit determines a target torque cannot be attained or sustained, or transmits substantially large slip data, skid data, or stability data.

In a conventional system a central engine throttle and one or more hydraulic brake pistons is engage to modify vehicle yaw torque. Electrically controlled wheels offer more dynamic positive and negative torque with far fewer mechanical linkages. Sensors locally attached to each wheel can provide slip and skid information directly to an adaptive field-oriented control (AF-OC) circuit. Each AF-OC circuit determines what its attainable torque can be for current conditions and transmits it to a torque budgeting circuit. The torque budgeting circuit can readjust its target torque commands in consideration of attainable torque for each wheel, user operations (steering), and lateral acceleration and stability data.

In an embodiment, sensors locally attached to each electrically powered wheel provide slip and skid information directly to an adaptive torque control or adaptive field-oriented control (AF-OC) circuit. Each adaptive torque control or AF-OC circuit determines what its attainable torque can be for current conditions and transmits it to a torque budgeting circuit. In an embodiment, the torque budgeting circuit readjusts all target torque commands in consideration of attainable torque for each wheel, user operations (steering), and lateral acceleration and stability data.

There are multiple ways to determine slip angle—some can use prediction based on RPM data from the wheel, some can use external sensors for tire deflection etc. In an embodiment a vehicle sensor measures land surface velocity and estimates RPM equivalents for each wheel. In an embodiment, the estimated RPM is compared by the torque control circuit with the actual RPM to determine when slip exceeds a maximum slip target.

One aspect of the invention is a method operable by a processor performing steps encoded as instructions on a non-transitory media, to control distribution of electric energy to at least one traction drive coupled to a wheel comprising: sensing the steering direction and speed of the vehicle; on the condition of speed below a threshold, distributing power to one or more wheels associated with only one axle and if turning to only one wheel of the only one axle; on the condition of speed above a threshold and when not turning, distributing power to wheels associated with only one axle; on the condition of aggressive cornering applying yaw controlled power to budget torque among at least four wheels; on the condition of inclement weather applying yaw controlled power to budget torque among at least four wheels; and on the condition of poor road conditions applying yaw controlled power to budget torque among at least four wheels.

The network communicates inputs such as measured yaw, vertical loading of each wheel, measured torque, wheel orientation, wheel speed, and tire slip. In an embodiment, the network distributes these inputs to each other wheel and to the yaw control apparatus.

The network communicates a desired torque value or a delta torque value for each traction drive and returns a confirmation or error message from each motor control circuit. Each traction drive may calculate parameters for its own motor configuration.

Drive parameters include a current, voltage, frequency, or phase for each wheel calculated by the yaw control apparatus. The drive parameters may be transmitted to each wheel if the wheel's control circuit does not calculate from the desired torque. In addition the network receives and distributes a yaw prediction for future delta torques from a user interface such as a gps or map or heads-up display or goggles.

A digital yaw control apparatus is communicatively coupled to a user interface and to a network. The network connects at least one control drive for each wheeled electric motor and provides a digital torque packet to said control drive. The control drive provides current or voltage to the wheeled motor. The control drive modulates the amplitude of the current or voltage. The control drive modulates the frequency or phase of the current or voltage. The wheeled electric motor has a torque sensor and transmits the resulting torque back to the digital yaw control apparatus. An authentication circuit ensures that the correct wheeled motor receives the digital torque packet and that the packet was transmitted by the correct control drive.

In an embodiment, a digital signal processor, or hardware discrete cosine transform (DCT) or software algorithm can filter noise and high frequency clutter from a feedback loop.

In one embodiment for two wheel control, the invention controls torque at a left and at a right rear wheels or at a left and a right front wheel, which eliminates the needs for at least one mechanical differential gear or any electronically controlled differential. Depending on the steering angle, steering speed, throttle pedal position, yaw velocity and vehicle speed, the apparatus applying negative torque to the left or right wheel, as required.

In one embodiment, this means that when entering a corner at high speed, moderate negative torque values are transmitted to the inside rear wheel. Simultaneously positive drive torque values transmitted to the outside rear wheel supports the steering motion of the car.

One aspect of the invention is a system including a processor coupled to non-transitory computer readable media and communicatively coupled to an operator interface and communicatively coupled to one or more electrical powered propulsion apparatuses.

The system determines a difference between desired vehicle yaw and measured vehicle yaw to determine a value for delta torque for each propulsion apparatus.

The system determines a value for positive or negative desired torque for each of the one or more electrically powered propulsion apparatuses and transmits the desired target torque to each of the one or more electrically powered propulsion apparatuses.

In embodiments, the system transmits a value as a digital value; or in another embodiment as an amplitude; or in another embodiment as a phase angle or as a frequency. In embodiments the system determines and transmits the value as a complex number. In an embodiment, the system further has at least one yaw sensor. In an embodiment, the system further has at least one pitch sensor. In an embodiment, the system further has at least one roll sensor. In an embodiment, the system further has at least one acceleration sensor.

In one embodiment of the invention, an electrically powered propulsion apparatus has one or more wheels, one or more electric motors, a motor controller and at least one sensor. The electrically powered propulsion apparatus further includes a surface sensor to report a vector of actual travel direction and speed. In an embodiment the system also has an edge of pavement sensor.

Applicant also discloses another aspect of the invention as a method to control an apparatus by executing instructions and parameters which control dynamic vehicle responsiveness and reflect an operators personality are accessible by an application programming interface (API). In an embodiment torque controlled electric motors may attached to non-wheel traction mechanisms such as fans, propellers, airscrews, caterpiller drives, paddles, and powered legs.

DriveApps would be loaded either on the central computer (VCU) or a separate user-provided computer that joins vehicle CANbus DriveApp architecture allows multiple apps. Examples include:
1. Sports car
2. A tow trailer
3. AWD ATV
4. AWD SUV
5. multiple-motor water or ice/snow vessel 6. multiple-motor aircraft 7. dual powered wheelchair or personal transporter
API:

All API calls are performed via sending a controller area network (CAN) command into the traction CANbus. CAN ID defines recipient of the command—each inverter also called an Adaptive Field-Oriented Controller (AF-OC) circuit has a CAN ID, as does Vehicle Control Unit (VCU) apparatus and Battery Management System (BMS) circuit.

All other subsystems are controlled from within these modules (e.g., wheel #2 load actuator is controlled from inverter #2 e.g. AF-OC-2, etc.)

1. Low-level (per-inverter) a. setTorque(wheel, torque, duration_ms) i. requests torque output of <torque> N*m from <wheel> wheel for <duration_ms> milli-seconds ii. returns 0 on success, non-0 on error (error codes TBD) b. setSlipLevel(wheel, level)—sets level of aggressiveness of slip control (low=street car use, high=race track) c. getTorque (wheel)—return torque value actually delivered d. getLoad (wheel)—get wheel loading in Newtons e. getRPM (wheel)—get RPM of the wheel f. getSlipAngle(wheel)—get actual sleep angle Method of operation includes at a field oriented motor controller coupled to a network, receiving a set torque command which specifies a wheel identifier, a value of target torque, and a duration wherein torque is in units of Newton*meters, and duration is in units of milliseconds; receiving a set slip level as an acceptable percentage of rotation; determining a voltage magnitude and voltage frequency for a motor; providing 3 phase electric current at said voltage magnitude and voltage frequency, receiving slip and skid measurements from the identified wheel; and returning success or error codes, which include the attainable torque at acceptable slip.

Mid-Level (Traction System—Level)

Rate of change in vehicle position in 3-dimensional polar coordinates getYawRate( )—Get Yaw Rate in Degrees/Second from Yaw Sensor i. getRollRate( )—get roll rate in degrees/second from roll sensor ii. getAttitudeRate( )—get attitude rate in degrees/second from attitude sensor 1. getAccel( )—get vehicle acceleration in mm/s 2(1 g=9,800 units) 2. getLoad( )—get total vehicle weight (dynamic, can be different from weight at rest due to aerodynamic lift etc) 3. get[max/min][params]( )—get min and max values of the parameters from the per-inverter level. Example:

int getMaxSlipAngle( )

4. setAccel(accel)—request acceleration of the vehicle in mm/s 2 (can be positive or negative)

A method for control of a vehicle by a processor performing the steps of a process including transmitting commands and receiving measured or stored data. In an embodiment, each sensor responds when it is addressed. In an embodiment, all sensors having the requested data respond in order when no address is specified in the command. In embodiments the commands and resulting data including at least one of the following: getYawRate—get yaw rate in degrees/second from yaw sensor; getRollRate—get roll rate in degrees/second from roll sensor; getAttitudeRate—get attitude rate in degrees/second from attitude sensor; getAccel—get vehicle acceleration in mm/s 2(1 g=9,800 units); getLoad—get total vehicle weight (dynamic, can be different from weight at rest due to aerodynamic lift etc); and get[max/min][params]( )—get min and max values of the parameters SlipAngle, Torque, SlipLevel, RPM, and Load.

In an embodiment, an operator control transmits to a vehicle control unit a command to setAccel(accel)—request acceleration of the vehicle in mm/s 2 (can be positive or negative). In an embodiment, an autonomous vehicle control system is coupled by an API to the vehicle control unit to request acceleration and vectored torque.

High-Level (Car-Level)

0. Battery Management System (BMS) functions
getMaxBattPower( )—get max battery power in kW. Used in VCU (Vehicle Control Unit) to understand how much power is available to distribute into wheels
i. getBattSOC( )—get state of charge of the battery in % ii. getBattAH( )—get remaining energy in the battery in AH (amp-hours) iii. getBattKWH( )—same in KWHrs iv. get-BattV( )—get current battery voltage—used by VCU to predict maximum possible power band v. getBattIR( )—get current internal resistance of the battery—used by VCU to predict maximum possible power band A method for operating a vehicle by a processor in a vehicle control unit coupled by a network to a battery management system includes transmitting commands to read parameters including at least one of the following: to get maximum battery power in kW: getMaxBattPower; to get state of charge of the battery in percent: getBattSOC; to get remaining energy in the battery in ampere-hours: getBattAH; to get remaining energy in the battery in kilowatthours: getBattKWH: to get current battery voltage: getBattV; to get current measured internal resistance of the battery: etBattIR.

Applicant also discloses another aspect of the invention as a system for predictive torque budgeting which receives traction estimates for impending road conditions. Traction measurements from previously recorded measurements can be retrieved using global positioning coordinates. Road geometry and incline is predicted from a stored 3D map. Traction measurements may be received from another vehicle in a peleton. Road conditions can be forecast from forward looking sensors on the vehicle itself. Wheel slip and wheel skid measured by a front wheel is transmitted to the adaptive field-oriented motor control of the tandem rear wheel. Wheel loading sensors and actuators provide direct feedback on attainable torque.

In an embodiment, the system receives predicted yaw events from a map, gps system, user goggles or heads up display.

Intelligent traction prediction engine—data sources: maps (curve ahead, etc) and GPS waypoints. GPS waypoints and prior experience on same route photo sensors before the front wheel to predict surface traction (camera looking out 1 foot ahead will give us 10 ms time at 60 mph to modulate front wheel) traction information from the front wheel fed into torque commands to the rear wheels (that will see the same part of pavement in .about.100 ms at 60 mph) wheel loading sensors & actuators (to actively manage instantaneous wheel loading)

Results: Based on the traction prediction method, the apparatus provides target torque requests. The results include matching a rear wheel to its corresponding front wheel; placing more energy on the rear axle wheels and less on the front axle wheels for climbing, anticipating tighter cornering and providing positive torque to a left side or providing negative torque to a right side or vice versa or both. In some cases, negative torque is provided to one rear wheel while positive torque is provided to the diagonally opposite wheel. The system anticipates desired yaw moments for the route and road conditions.

In an embodiment, a rear wheel AF-OC circuit adjusts its voltage magnitude and frequency magnitude output when a front wheel AFOC circuit determines a target torque cannot be attained or sustained, or transmits substantially large slip data, skid data, or stability data.

In an embodiment a torque budgeter circuit adjusts the target torque for rear wheel AF-OC circuits when at least one front wheel AFOC circuit determines a target torque cannot be attained or sustained, or transmits substantially large slip data, skid data, or stability data.

Applicant also discloses another aspect of the invention as a method, which provides through an API, a process to adaptively control thrust instead of throttle and brake operation. The vehicle control unit receives acceleration requirements from the higher level autonomous systems and determines positive or negative torque for each electric motor driven wheel.

CONCLUSION

The claimed subject matter is easily distinguished from conventional power train differentials by electrically reallocating power from one set of reduction gears to another set of reduction gears when the operator calls for improved forward acceleration to overcome inertia. The effect is to dynamically exchange the performance characteristics of the vehicle among front wheel drive, rear wheel drive, and all wheel drive.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Figure 1:
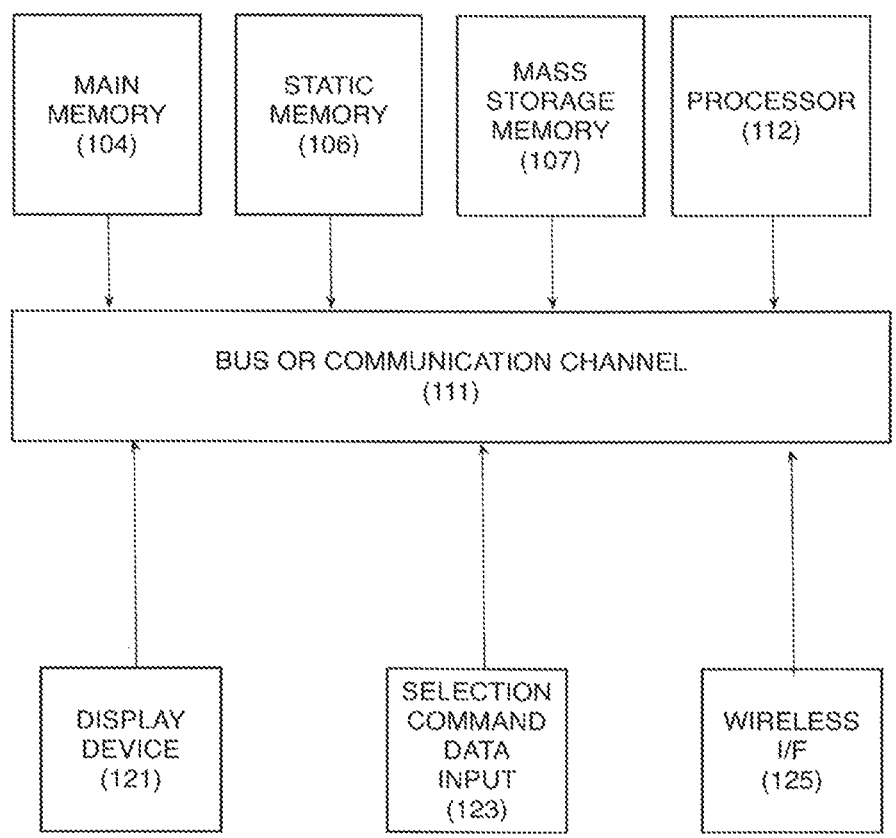
FIG. 1 is a block diagram of a conventional processor used for performing method steps in an apparatus.

FIG. 1 illustrates an exemplary programmable processor comprising a bus or communication channel 111 coupling main memory 104, static memory 106, mass storage memory 107, and a processor circuit 112 for executing instructions, and in embodiments at least one interface to couple a display device 121, a selection command data input 123, and/or a wireless interface 125.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Computer-readable storage media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. An apparatus for controlling an adaptive field-oriented electric motor comprising:

a current speed determination circuit;
a desired acceleration determination circuit;
a torque generation distribution circuit; and
a voltage magnitude and voltage frequency determination circuit; whereby only front wheel adaptive field-oriented motor control circuits receive voltage magnitude and voltage frequency torque generation signals when a threshold speed has been attained and no further acceleration is desired, and whereby only rear wheel adaptive field oriented motor control circuits receive voltage magnitude and voltage frequency torque generation signals when acceleration is desired and a threshold speed has not been exceeded.

2. The apparatus of claim 1 which controls only one wheel at any forward or reverse speed below a threshold.

3. The apparatus of claim 1 which controls all four wheels on the condition of inclement weather, poor road quality, or aggressive cornering.

\* \* \* \* \*